United States Patent [19]

Bertrand

[11] Patent Number: 4,792,190
[45] Date of Patent: Dec. 20, 1988

[54] MACHINE FOR CUTTING CURBSTONES, SIDEWALKS OR THE LIKE

[76] Inventor: René Bertrand, 720 St-Jacques, St-Jean (Quebec), Canada, J3B 2M7

[21] Appl. No.: 79,436

[22] Filed: Jul. 30, 1987

[51] Int. Cl.$^4$ .............................................. E01C 23/09
[52] U.S. Cl. ...................................... 299/41; 299/73; 299/75; 404/90; 83/488; 83/928
[58] Field of Search ............... 299/39, 41, 75; 404/90; 125/14; 30/379.5; 83/488, 928

[56] References Cited

U.S. PATENT DOCUMENTS

3,820,233  6/1974  Baker ................................ 83/488 X
4,433,871  2/1984  Bertrand ............................ 299/41

Primary Examiner—Jerome W. Massie
Assistant Examiner—Matthew Smith
Attorney, Agent, or Firm—Foley & Lardner, Schwartz, Jeffery, Schwaab, Mack, Blumenthal & Evans

[57] ABSTRACT

There is disclosed a machine including a powered truck-like vehicle having a support base and an apparatus mounted on the base for cutting a drive-in passage across a curbstone, a sidewalk or the like. The apparatus comprises two spaced parallel booms mounted at one end on the base and rail-structure-holding heads connected to the booms and displaceable along them. A rail structure including an elongated upper suspension member, having a non-circular cross section, is mounted on the heads by extension of the suspension member through rotary pillow blocks of the heads of which the cylinders have like non-circular bores. A linkage powered mechanism, interconnecting the heads and the suspension member, allows oscillation of the latter about its longitudinal axis and consequently oscillation of the rail structure of which it is a part. A power jack allows shifting of the rail structure laterally with respect to the booms. A saw carrier, holding the saw, is mounted on the rail structure so that it can move along it and also be oscillated with it. Additionally, the saw is movable on the carrier in a direction transverse to the rail structure and, also, the carrier and saw are movable bodily in the same direction.

28 Claims, 10 Drawing Sheets

MACHINE FOR CUTTING CURBSTONES, SIDEWALKS OR THE LIKE

BACKGROUND OF THE INVENTION

1. Field of the Invention

The present invention relates to a machine for cutting curbstones, sidewalks or the like. It is an improvement of the machine disclosed in my prior U.S. Pat. No. 4,433,871 of Feb. 28, 1984.

2. Description of the Prior Art

In the machine of the above patent, a saw-holding carrier is made to roll along a bridge structure on either one of two riding tracks fixed relative to each other: one track being used when it is desired to cut a horizontal slot through a sidewalk or curbstone and the other track, making a fixed predetermined angle with the first track, being used when it is desired to cut a slot which is inclined at the said predetermined angle. When it is desired to move the carrier and it saw from one track to the other, it is necessary first to displace the carrier at the end of the one track, shift it onto a turntable which is then rotated manually by 180° so that the carrier can then be pushed over the other track. The operation is awkward, at best, and inefficient. Furthermore, if the saw has to be operated at an angle other than the aforesaid predetermined angle, a different and separate mechanism has to be used to tilt the complete bridge structure on which the two riding tracks are provided, as aforesaid.

Also, with the machine of the prior U.S. patent, the length and depth of the cuts that may be obtained depend solely on 1—the length of the stationary bridge structure and 2—the length of the carrier on which the saw is slidably mounted; the carrier being also stationary with respect to the bridge structure. If longer and/or deeper cuts have to be provided, the complete machine has to be shifted in the appropriate directions.

Another disadvantage of the prior machine is that if the bridge structure is not properly positioned parallel to the curbstone or sidewalk to be cut, it has to be lifted off the ground and the vehicle repositioned to ensure full parallelism of the bridge structure and curbstone or sidewalk.

SUMMARY OF THE INVENTION

The machine of the present invention avoids the above disadvantages by providing a mechanism mounting the bridge structure, or rail structure as called herein, on two spaced horizontal booms in a manner such that the rail structure may be oscillated by a single mechanism so that the saw mounted on a carrier riding on a single track arrangement of the rail structure can be made horizontal or may be inclined at any desired angle without having to shift the saw carrier from one track to another track at a different angle or having to use a separate mechanism for oscillating the bridge structure.

More specifically and according to one aspect of the invention, there is provided a machine including a powered truck-like vehicle having a support base and an apparatus mounted on the base for cutting a drive-in passage across a curbstone, a sidewalk or the like, the apparatus comprising:

two spaced parallel booms mounted at one end on the base;

a pair of rail-structure-holding heads slidably mounted each on one of the booms, and means for displacing the heads along the booms;

an elongated main rail structure extending between the heads, the main rail structure including an elongated upper suspension member having a non-circular cross section and a longitudinal axis;

means mounting the main rail structure on the heads for oscillation of the rail structure about the longitudinal axis, the main rail structure mounting means comprising:

pillow blocks each having a rotary cylinder, the pillow blocks being each mounted on one of the heads; the cylinders being formed with bores therethrough of non-circular cross section; wherein the rail structure suspension member slidably extends through the non-circular bores for rotation with the cylinders;

operative means interconnecting at least one of the heads and the respective pillow-block cylinder for oscillating the suspension member, and thus the rail structure, about the longitudinal axis;

a saw carrier and means, solid with the saw carrier, for mounting the saw carrier on the oscillatable rail structure and for displacing the saw carrier thereon along a first direction parallel to the longitudinal axis, and a saw mounted on the carrier, and wherein the carrier includes first means for displacing the saw on the carrier in a second direction perpendicular to the first direction.

According to a further aspect of the invention, there is provided a machine including a powered truck-like vehicle having a support base and an apparatus mounted on the base for cutting a drive-in passage across a curbstone, a sidewalk or the like, the apparatus comprising:

two spaced parallel booms mounted, at one end, on the base;

a pair of rail-structure-holding heads slidably mounted each on one of the booms and means for displacing the heads along the booms;

an elongated main rail structure extending between the heads and means mounting the main rail structure on the heads, the rail structure including an elongated upper suspension member having a longitudinal axis;

a saw carrier, and means, solid with the saw carrier, for mounting the saw carrier on the main rail structure and for displacing the saw carrier thereon in a first direction parallel to the suspension member longitudinal axis;

a saw mounted on the carrier and wherein the carrier includes first means for displacing the saw on the carrier in a second direction perpendicular to the first direction, and a power jack and means mounting the ends of the jack respectively to one of the heads and to the rail structure suspension member for shifting the rail structure along the first direction, laterally with respect to the booms.

Preferably, the machine should further comprise a power jack and means mounting the ends of the jack respectively to one of the heads and to the rail structure for shifting the rail structure along the first direction, laterally with respect to the booms.

Preferably also the means for displacing the heads along the booms comprise: sleeves slidable on the booms; means securing the rail-structure-holding heads to the sleeves; power jacks having ends secured respectively to the support base and sleeves for displacing the sleeves along the booms, and means mounting the pilow blocks on the heads for pivotal movement about vertical axes whereby the rail structure may be moved from a first position wherein it is perpendicular to the booms to a second position wherein it is slightly inclined relative thereto.

Other features and advantages of the invention will become apparent from the following description of a preferred embodiment, having reference to the appended drawing diagrammatically illustrating it.

BRIEF DESCRIPTION OF THE DRAWINGS

FIG. 1 is a perspective view of a machine made according to the invention, including the appartus for cutting a drive-in passage across a concrete curb-stone, sidewalk or the like;

DESCRIPTION OF THE PREFERRED EMBODIMENT

General Description

Prior to going into a detailed description of the machine shown in the drawings, a general one is given in order to better appreciate the various improvements brought about by the present invention.

Figure 1:
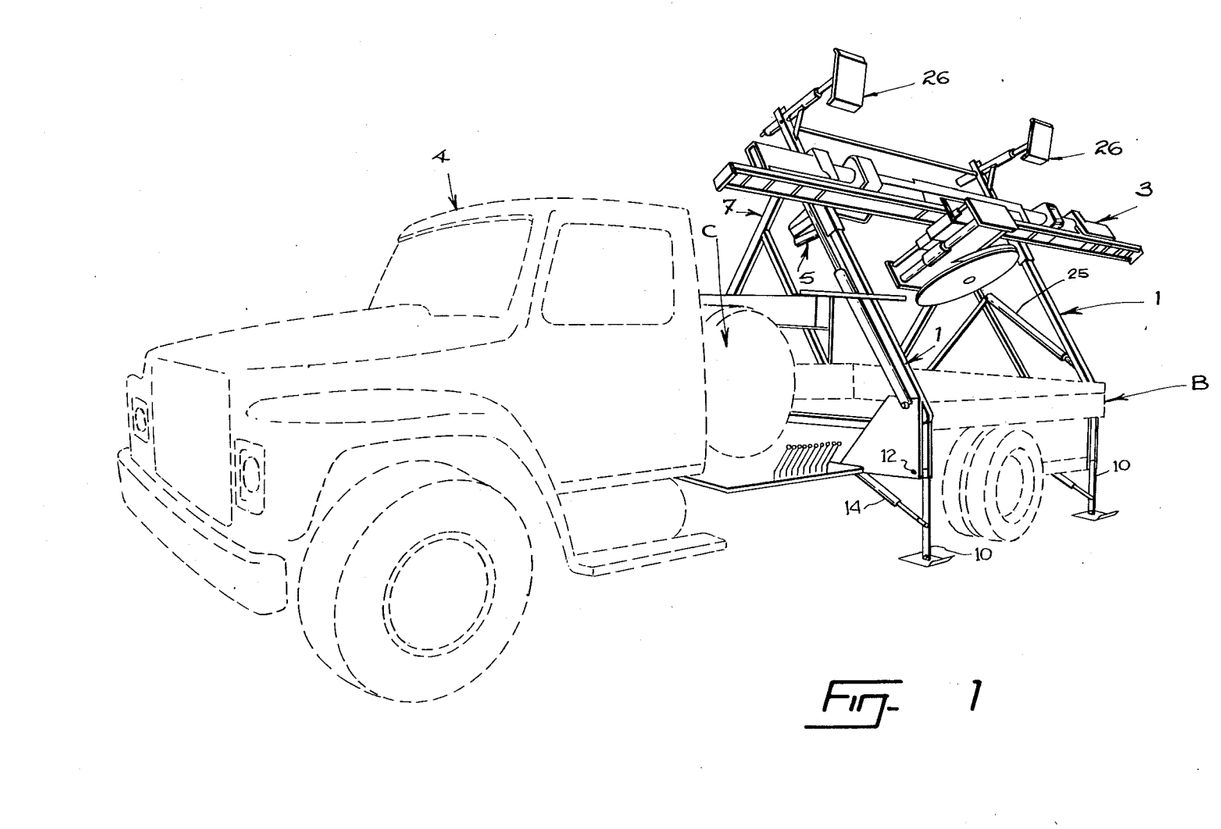

FIG. 1 shows the machine to be a motor truck having a cab A and a base B at the rear in the form of a box serving to hold sundry implements, useful in the operation of the machine, and a fluid pressure reservoir C between the box B and the cab A. The pressure fluid may either be air or oil depending on whether pneumatic or hydraulic power jacks are used to operate the various components of the machine.

Figure 12:
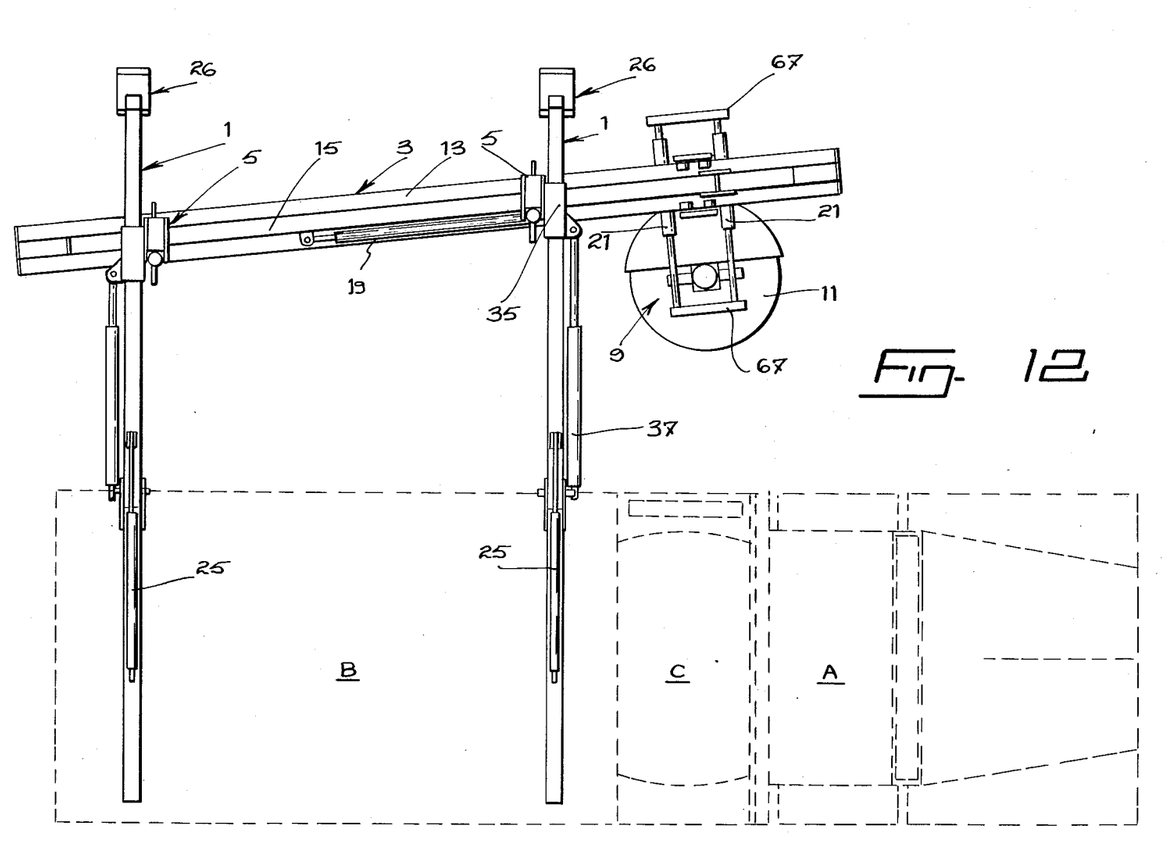
FIG. 12 is a view similar to that of FIG. 2 with the rail structure shown at an incline.
Figure 13:
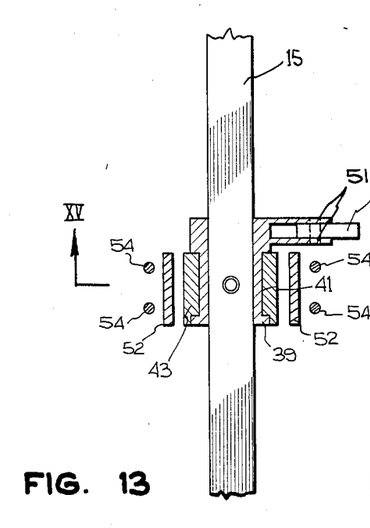
FIGS. 13 and 14 are partial cross-sectional views of the suspension member mounting means showing the suspension member respectively perpendicular to the booms and inclined relative thereto.

Two spaced parallel booms 1 are pivoted at one end to the base B and an elongated main rail structure 3 extends between the boom 1 and preferably beyond, being mounted on the latter by means of rail-structure-holding heads 5 so as to be displaced bodily along the booms while being usually held perpendicular thereto although provision is made to allow a slight incline as shown, largely exaggerated however in FIG. 12.

Figure 3:
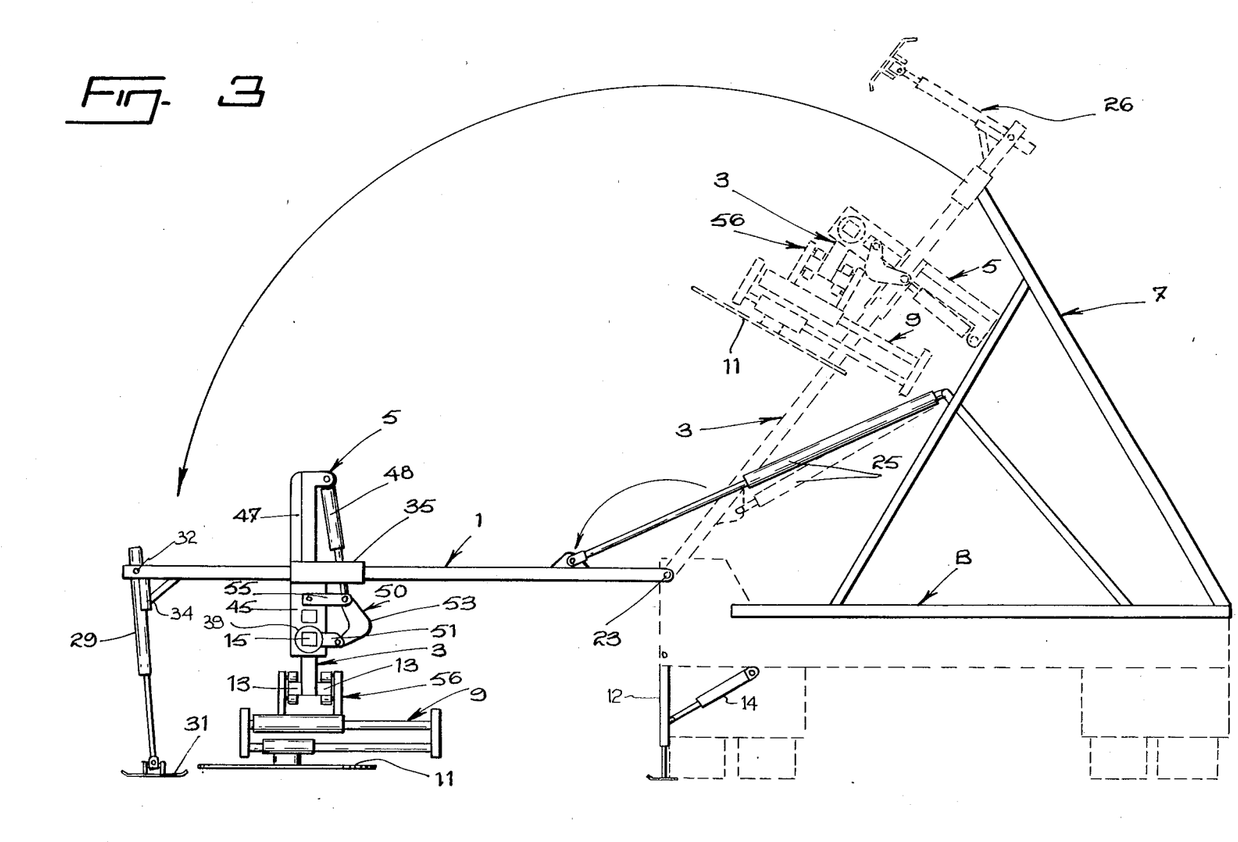
FIGS. 3, 4 and 5 are end elevation views showing the saw in various positions.

As clearly shown in FIG. 3, the booms 1 and the rail structure 3 can be pivoted, as an assembly, from a rest position wherein it lies against an upright support 7 and above the base B to an operative position where the assembly 1, 3, 5, is swung outwardly of the base B for cutting a curbstone, a sidewalk or the like.

A carrier 9, having a concrete or asphalt cutting saw 11 rotatable about an axis generally perpendicular to the carrier, is mounted on the rail structure 3 so that it can be displaced on a pair of parallel spaced tracks 13 of the rail structure 3 in a first direction, both ways, lengthwise of the rail structure. Provision is also available for moving the saw 11 along a second direction perpendicular to the first and within the carrier 9. The first and second directions are indicated by arrows in FIG. 6.

Figure 4:
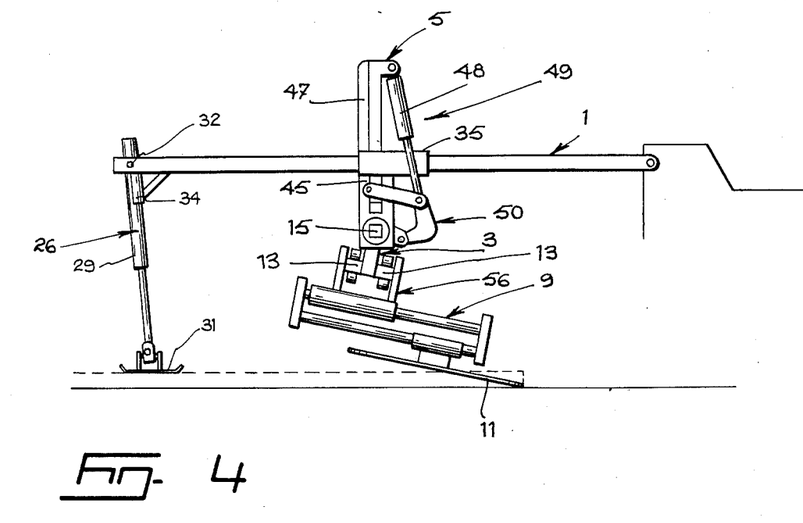
Figure 5:
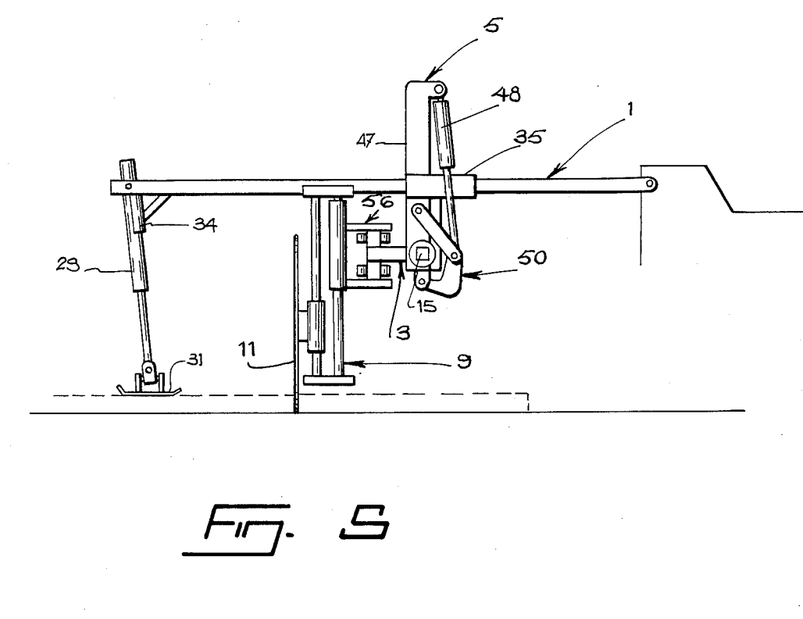

Survey of FIGS. 3, 4 and 5 illustrates that the carrier 9 and its saw 11 can be swung or oscillated from a horziontal position to an inclined position and to a vertical position of the saw 11. Thus, the apparatus affords easy adjustment of the carrier 9 to allow the saw 11 to cut slots that may be horizontal, vertical or inclined to suit any particular situation. This operation is obtained with a single mechanism and without having to move the carrier 9 from one face of the rail structure to the other, using a turntable as in the machine of the prior art patent aforesaid.

Figure 2:
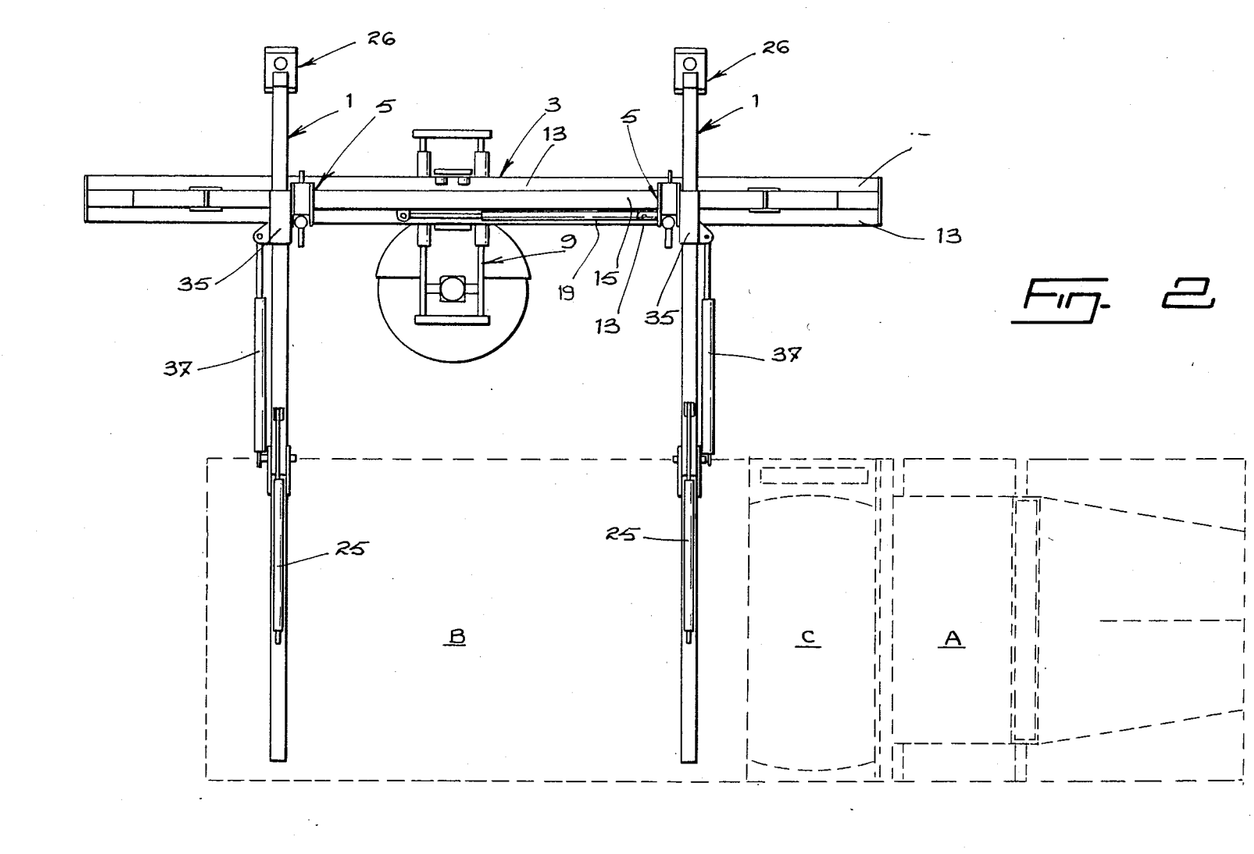
FIG. 2 is a top plan view.

The rail structure 3 further comprises a square elongated suspension member 15 (FIG. 6) made solid with the rail tracks 13 by stem members 17 inserted between and secured to the latter as by welding or otherwise. The suspension member 15 is able to slide through the lower ends of the rail-structure-holding heads 5. A power jack 19 (FIG. 2) has its ends pivotally mounted respectively on one head 5 and on the suspension member 15. With this arrangement, it is possible to shift the rail structure 3, and the saw carrier 9 mounted thereon, along the aforesaid first direction; this feature being clearly revealed by comparing FIGS. 2 and 12. Thus, the total length of the longitudinal slot cut by the saw 11 is not restricted to the length of the rail structure 3, as in the prior art machine, bu may be lengthened at either end by simply removing the saw from the slot and shifting the rail structure 3 by actuation of the power jack 19.

Figure 9:
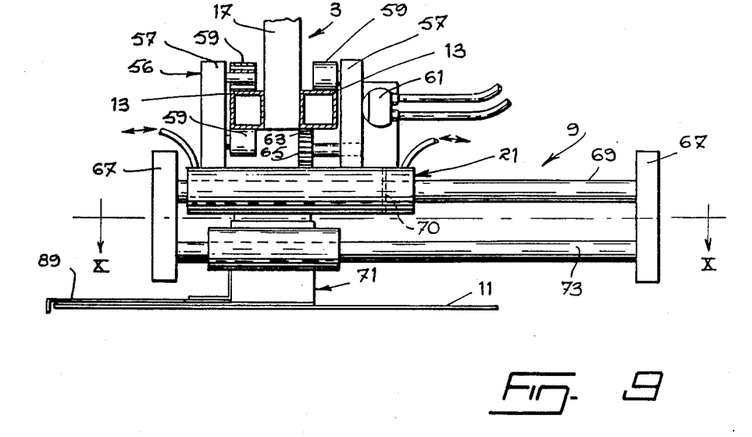
FIG. 9 is a side elevation view of the saw carrier and its means for mounting it on the rail structure.

Similarly, and particular reference being made to FIG. 9, the depth of the slot cut by the saw 11 along the second direction is not limited to the length of the carrier 9, the latter being indeed shiftable bodily in the same direction by a double-action power jack 21.

Detailed Description

Each boom 1 is pivoted at 23 (FIG. 3) on the base B and can be moved between rest and active positions by a power jack 25, as shown. Obviously, the two jacks 25 of the two booms 1 are operated in synchronism.

As shown in FIGS. 1 and 3, the base B is stabilized on the ground by a pair of footed legs 10, pivoted at 12 on the base B and made retractible by power jacks 14.

The free end of each boom 1 is provided with a levelling jack 29, having a pivotable foot 31 and being pivoted at 32 to the boom. A slightly inwardly inclined arcuate bed member 34, fixed to boom 1, freely receives the upper end of the jack 39 and holds it during movement of the boom 1 between the aforesaid rest and active positions. The jacks 29 are preferably tilted inwardly to secure a firmer hold on the ground and are adjusted according to the level condition of the lot where the base feet 31 lie; the intent being to place the booms 1 into a generally horizontal common plane.

Jacks 29 may be interconnected by a strut 33 (FIG. 6) for stability.

Figure 6:
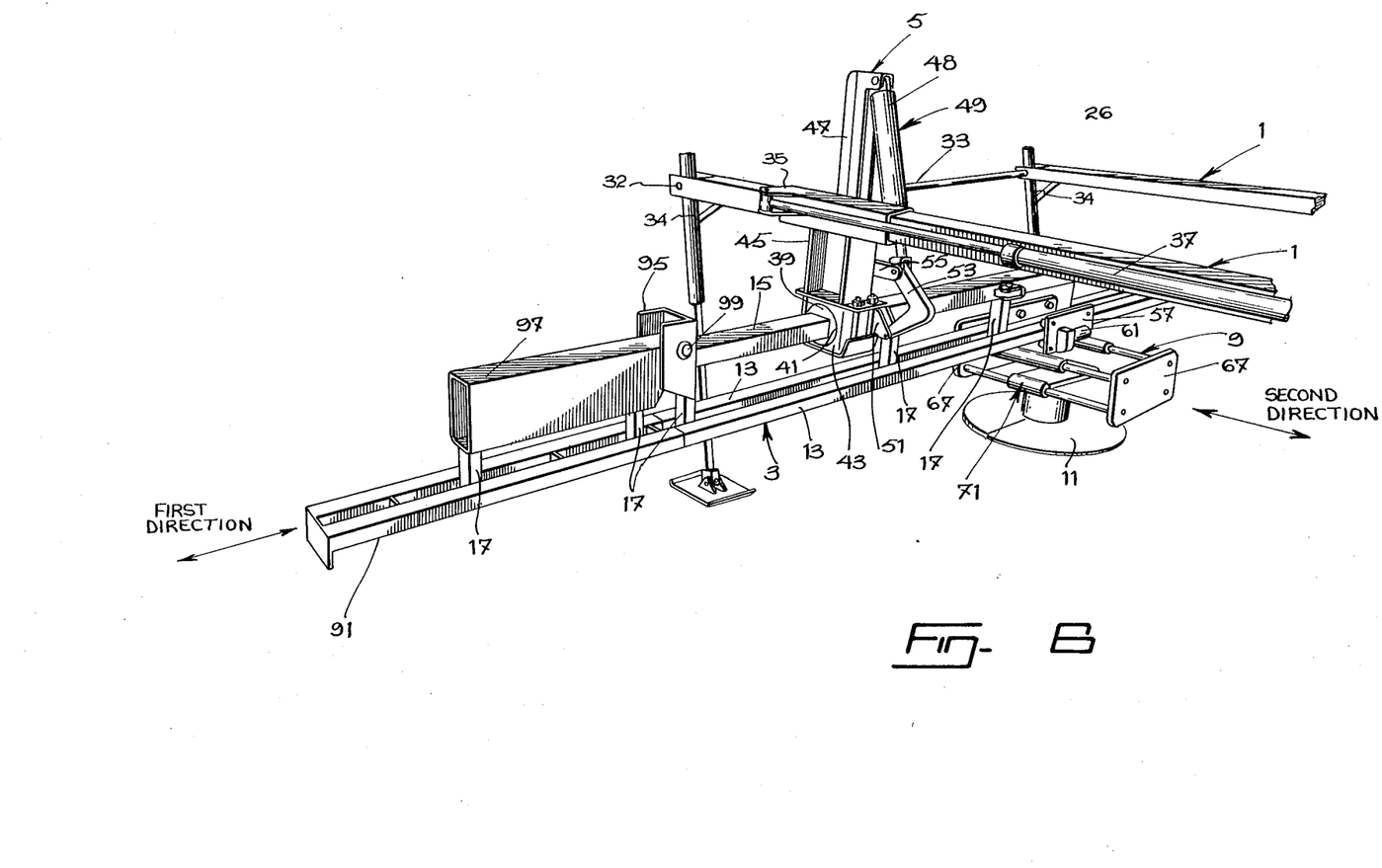
FIG. 6 is a perspective view of a portion of the apparatus.

As best shown in FIG. 6 also, the booms 1 have a square cross-section and sleeves 35 slide thereover, having a bore of like square cross-section. The sleeves 35 are solid with the rail-stucture-holding heads 5. Power jacks 37 have one end pivotally connected to the sleeves 35 (FIG. 1) and the other end pivotally connected to the base B or to the booms 1 so that synchronized actuation of the jacks 37 causes bodily displacement of the heads 5, the rail structure 3 and the saw carrier 9 along the beams 1, that is in the aforesaid second direction.

Figure 14:
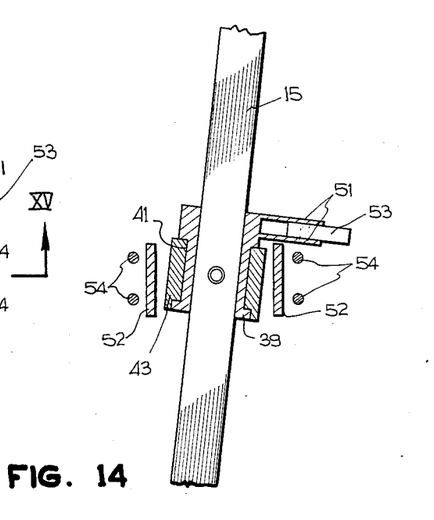
Figure 15:
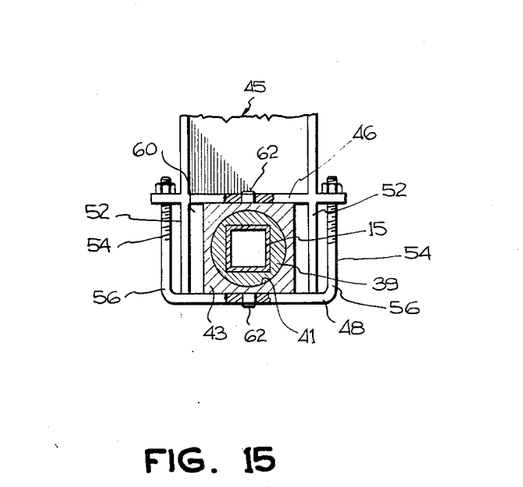
FIG. 15 is a view in a plane along line XV—XV of FIG. 14.

As mentioned previously, the main rail structure 3 is mounted on the heads 5 for oscillation about the longitudinal axis of the suspension member 15 by means best illustrated in FIG. 6, the means being however shown for only one of the booms 1; identical means (not shown in FIG. 6) being applied to the other boom 1. For this purpose, the square suspension member 15 slides across square bores formed at the center of cylinders 39 rotatable in bores 41 of pillow-blocks 43. The latter are each mounted at the bottom end of one vertical channel-shaped member 45 of which the upper end is fixed, as by welding, to the underside of the sleeve 35 (FIG. 6). Referring to FIG. 15, the bottom end of each channel member 45 has an upper plate 46 and a lower plate 48; both projecting laterally of the flanges 52 of member 45. The lower plate 48 is free of the member 45 and is fixed to it by bolts 54 of which one end is solid with upturned ends 56 while the other end extends through appropriate holes of upper plate 46; nuts 58 solidly holding the lower plate 48 against the bottom end of member 45. As shown in FIG. 15, the pillow-block 43 is housed in the space 60, just defined, and is mounted on the plates 46, 48, by pins 62 whereby to allow limited tilting of suspension member 15 about the longitudinal vertical axis of channel member 45. The movement is illustrated in FIGS. 14 and 12. The pillow-block cylinders 39 project outwardly of the bores 41 (FIGS. 7, 8, 13 to 15). The rail-structure-holding heads 5 have vertical column members 47 (FIGS. 3 to 6) solid with the channels 45, and have operative means 49 that interconnect the columns 47 and the projecting end of the pillow-block cylinders 39 to cause oscillation thereof. Each operative means 49 comprises, as shown, a power jack 48 and a linkage mechanism 50. The latter mechanism 50 comprises (FIGS. 3 and 7) a pair of bracket plates 51 secured to and radially projecting from the rotary cylinder 39; an elbowed link 53 pivoted at one end to the bracket plates 51 and pivoted at the other end to one end of a straight link 55 of which the other end is pivoted to the web of the channel member 45. The free end of the rod of the power jack 48 is, in turn, pivoted to both the elbowed link 53 and the straight link 55. The other end of jack 48 is pivoted to holding head.

Inspection of FIGS. 3 to 6 will show that expansion of the power jack 48 causes, through the linkage mechanism 50 aforesaid, clockwise rotation of the suspension member 15 and thus of the rail structure 3 and saw carrier 9; and retraction of the jack 48, counterclockwise rotation.

It will be appreciated that the operative means 49 need be provided only on one of the two rail-structure-holding heads 5; the latter means 49 comprising, as said: the column 47, the jack 48 and the linkage mechanism 50.

Figure 7:
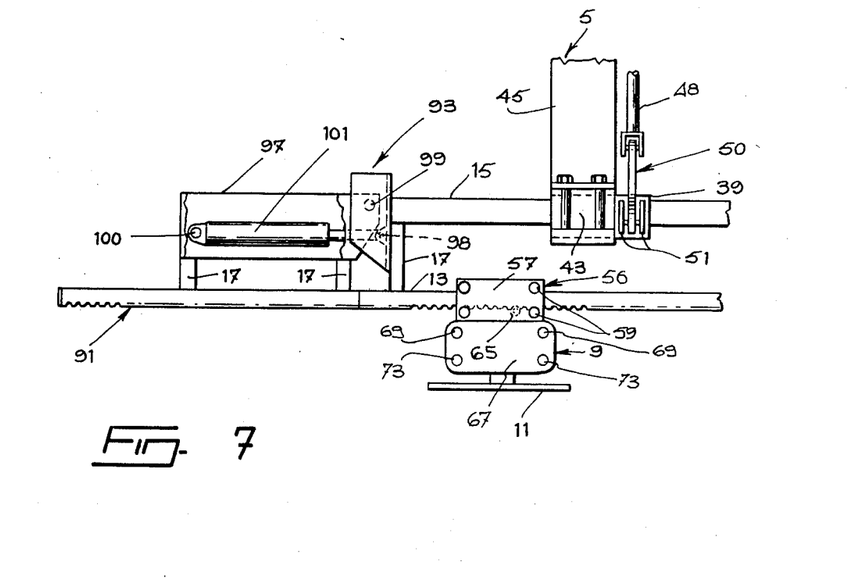
FIGS. 7 and 8 are side elevation views of one end portion of the apparatus, showing the corresponding terminal rail section in two different positions.

Referring to FIG. 9, the saw carrier 9 is mounted to be suspended on the tracks 13 of the rail structure 3 so that it can oscillate with it, as aforesaid. It can also be displaced, by the same carrier mounting means 56, along the tracks 13 in the first direction, that is lengthwise of the rail structure 3. The carrier mounting means 56 comprise: a pair of mounting plates 57 disposed on either side of the rail structure 3 adjacent the tracks 13; a series of rollers 59 (FIG. 11) mounted on three surfaces of the tracks 13 for free wheeling, and a first power means for driving the plates 57 and rollers 59 along the tracks 13. On the other hand, and as shown in FIG. 9 particularly, the first power means comprise a motor 61, on one of the plates 57, driving a pinion 65 in mesh with a rack 63 solid with and running lengthwise of an adjacent rack 13; the pinion 65 being disposed between two adjacent lower rollers 59 (FIG. 7).

The saw carrier 9 is constituted by two terminal plates 67 connected by the aforesaid pairs of double-action power jacks 21, as second power means; carrier 9 being thus made displaceable in the second direction which is normal to the first direction, that is, normal to the rail structure 3. The power jacks 21 include rods 69 fixed at their ends to the terminal plates 67 and to pistons 70 within the jack cylinders. Thus, when the jacks 21 are energized, the carrier 9 and its saw 11 move bodily relative to the carrier mounting means 56, in the said second direction, one way or the other depending on how the jacks 21 are fluid pressure fed. It is pointed out here that the cylinders of the jacks 21 are secured to the two plates 57 of the carrier mounting means 56.

Figure 11:
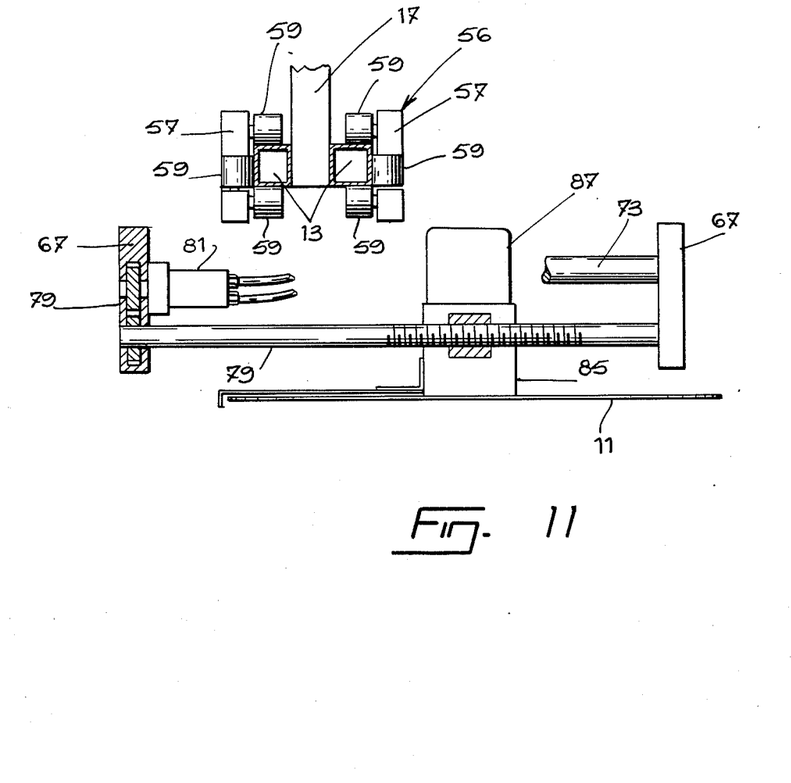
FIG. 11 is an elevation view of certain parts of the saw carrier and of the means mounting the carrier on the rail structure.

The saw 11 is mounted on a driving assembly 71 which includes a pair of rods 73, beneath the jack rods 69, and a motor bridge 75 formed, at its ends, with sleeves 77 slidably displaceable along the rods 73. The bridge 75 is motorized by a pair of screws 79 journaled at one end in bearings of one of the plates 67 while connected, at the other end, to a gear transmission 80 in the other plate 67, which transmission 80 is powered by a motor 81 (FIG. 11). The screws 79 mesh, on the other hand, with two threaded bores 83 formed across the motor bridge 75. With this arrangement, when the motor 81 is energized, it causes rotation of the screws 79 through the gear transmission 80 and displacement of the motor bridge 75 between the plates 67.

Figure 10:
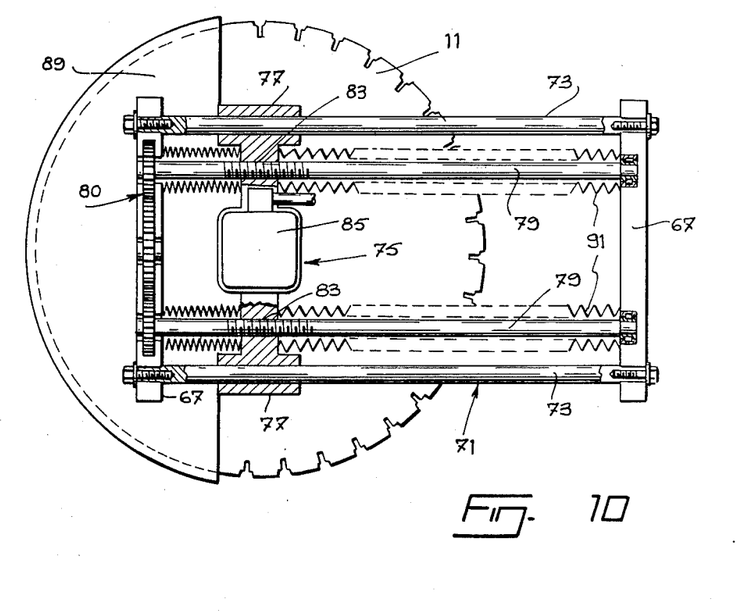
FIG. 10 is a plan view along line X—X of FIG. 9.

Thus, the saw 11 can be moved in the second direction with respect to the plates 67, which will be the most usual situation, but it can also be displaced bodily with the carrier 9 when the latter moves in response to the action of the double-action jacks 21. The latter situation is quite advantageous, as aforesaid, when a transverse slot through a sidewalk or curbstone cannot be terminated because the motor bridge 75 has reached the rightward plate 67 (FIG. 10). At that time, the bridge 75 is moved to the left near the transmission 80 and then the carrier 9 and bridge 75 together bodily moved to the right until the saw enters the slot again. The operation can be continued because of the extra stroke length available to the bridge 75.

The motor bridge 75 has, at its center, a motor housing 85 into which is secured a motor 87 (FIG. 11); the saw 11 being operatively fixed to the shaft of the motor. A protector 89, covering half of the circumference of the saw 11 may preferably be provided, being adjustably mounted on the motor housing 85.

Dust protection bellows 91 may also be provided around the screws 79.

Referring to FIGS. 2, 12 to 15 and according to the above description, the rail structure 3 may be moved from a first position wherein it is perpendicular to the booms 2 to a second position wherein it is slightly inclined, the inclination shown in FIG. 12 having seen grossly exaggerated for the sake of clarity. As aforesaid, this feature may be useful where the truck is not properly aligned with the curbstone or sidewalk to be cut.

Finally, the apparatus may be provided with terminal rail sections 91, (FIGS. 7 and 8), at the ends of the main rail section 3 beyond the rail-structure-holding heads 5; terminal sections 91 being normally in the continuation of the main section 3 and being constructed for allowing displacement of the saw carrier 9 thereon. Appropriate powered pivot means 93 may be provided to give an incline to the carrier 9 and thus to the saw 11 to allow the latter to cut inclined slots at the ends of the longitudinal slots through the sidewalk or curbstone.

Figure 8:
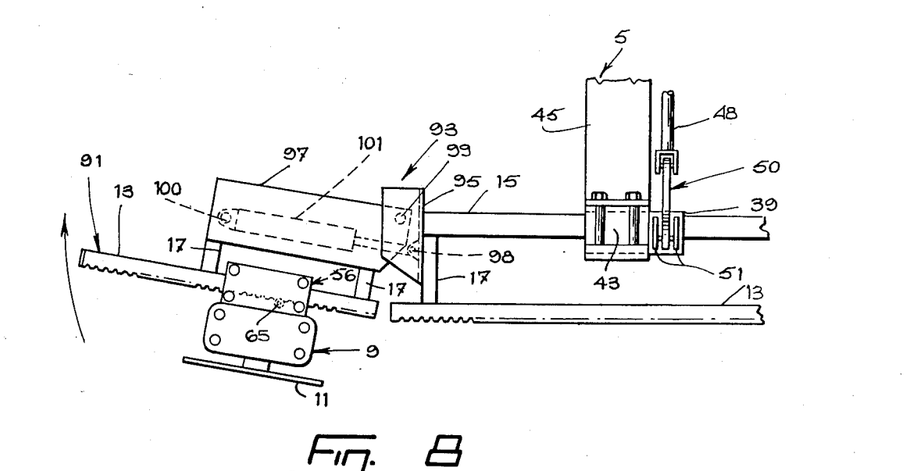

As an example, shown in FIGS. 7 and 8, the powered pivot means 93 may be constituted by an upright channel member 95, of which the web is fixed to the end of the suspension member 15 and to the adjacent stem 17, and a further but horizontal channel member 97 secured to the other stems 17. One end of the member 97 enters member 95 and is pivotally mounted on the flanges thereof at 99. Pivotal movement of the channel member 97 and terminal section 91 may be obtained by a power jack 101 having one end pivoted at 98 to the web of the channel 95, beneath the pivot 95, and the other end pivoted at 100 to the second channel 97.

I claim:

1. A machine including a powered truck-like vehicle having a support base and an apparatus mounted on the base for cutting a drive-in passage across a curbstone, a sidewalk or the like, said apparatus comprising:
   two spaced parallel booms mounted at one end on said base;
   a pair of rail-structure-holding heads slidably mounted each on one of said booms, and means for displacing said heads along said booms;
   an elongated main rail structure extending between said heads, said main rail structure including an elongated upper suspension member having a non-circular cross section and a longitudinal axis;
   means mounting said main rail structure on said heads for oscillation of said rail structure about said longitudinal axis, said main rail structure mounting means comprising:
   pillow blocks each having a rotary cylinder, said pillow blocks being each mounted on one of said heads; said cylinders being formed with bores therethrough of non-circular cross section; wherein said rail structure suspension member slidably extends through said non-circular bore for rotation with said cylinders;
   operative means interconnecting at least one of said heads and the respective pillow-block cylinder for oscillating said suspension member, and thus said rail structure, about said longitudinal axis;
   a saw carrier and means, solid with said saw carrier, for mounting said saw carrier on said oscillatable rail structure and for displacing said saw carrier thereon along a first direction parallel to said longitudinal axis; and
   a saw mounted on said carrier, and wherein said carrier includes first means for displacing said saw on said carrier in a second direction perpendicular to said first direction.

2. A machine as claimed in claim 1, further comprising a power jack and means mounting the ends of said jack respectively to one of said heads and to said rail structure for shifting said rail structure along said first direction, laterally with respect to said booms.

3. A machine as claimed in claim 1, wherein said rail structure oscillating means comprise: linkage means between said pillow block cylinder and said rail-structure-holding head and a power jack having one end mounted on said head and the other end mounted on said linkage means, constructed to cause oscillation of said pillow block when said power jack is actuated whereby to cause oscillation of said rail structure and said saw carrier in unison.

4. A machine as claimed in claim 3, wherein said linkage means include a bracket secured at one end of said pillow block cylinder and extending radially therefrom.

5. A machine as claimed in claim 1, including second means for displacing said saw carrier and saw bodily in said second direction.

6. A machine as claimed in claim 5, wherein said rail structure comprises parallel tracks extending in said first direction and wherein said saw carrier mounting means comprise:
   a pair of mounting plates, each on one side of said rail structure;
   rollers on said mounting plates riding on said parallel tracks, and
   power means for driving said plates and rollers along said tracks.

7. A machine as claimed in claim 6, wherein said saw carrier comprises:
   two terminal plates spaced from one another;
   a pair of double-action power jacks projecting in said second direction and including jack rods having ends secured to said terminal plates and operative cylinders through which said jack rods extend; and
   means securing said cylinders to said mounting plates of said carrier mounting means;
   said double-action power jacks constituting said second means for displacing said carrier and saw bodily in said second direction.

8. A machine as claimed in claim 7, wherein said first means for displacing said saw on said carrier, in a second direction perpendicular to said first direction, comprise:
   a pair of guide rods spaced from said double-action power jacks with respect to said carrier mounting plates, said guide rods having ends secured to said carrier terminal plates;
   a saw mounting-motor bridge including sleeve members slidable on said guide rods;
   a motor on said bridge operatively connected to said saw; and
   power means for displacing said bridge, with said motor and saw thereon, between said terminal plates.

9. A machine as claimed in claim 8, wherein said parallel tracks of said elongated rail structure are two elongated rail members spaced from one another and wherein said machine further comprises: stems, perpendicular to said spaced rail members and located therebetween; said stems securing said rail members to said suspension member.

10. A machine as claimed in claim 6, further comprising a power jack and means mounting the ends of said jack respectively to one of said heads and to said rail structure for shifting said rail structure along said first direction, laterally with respect to said booms.

11. A machine as claimed in claim 9, wherein said rail structure oscillating means comprise: linkage means between said pillow block cylinder and said rail-structure-holding head and a power jack having one end mounted on said head and the other end mounted on said linkage means, constructed to cause oscillation of said pillow block when said power jack is actuated whereby to cause oscillation of said rail structure and said saw carrier in unison.

12. A machine as claimed in claim 9, wherein said linkage means include a bracket secured at one end of said pillow block cylinder and extending radially therefrom.

13. A machine as claimed in claim 5, further comprising a power jack and means mounting the ends of said jack respectively to one of said heads and to said rail structure for shifting said rail structure along said first direction, laterally with respect to said booms.

14. A machine as claimed in claim 5, wherein said rail structure oscillating means comprise: linkage means between said pillow block cylinder and said rail-structure-holding head and a power jack having one end mounted on said head and the other end mounted on said linkage means, constructed to cause oscillation of said pillow block when said power jack is actuated whereby to cause oscillation of said rail structure and said saw carrier in unison.

15. A machine as claimed in claim 14, wherein said linkage means include a bracket secured at one end of said pillow block cylinder and extending radially therefrom.

16. A machine as claimed in claim 9, wherein said means for displacing said heads along said booms comprise: sleeves slidable on said booms; means securing said rail-structure-holding heads to said sleeves; power jacks having ends secured respectively to said support base and sleeves for displacing said sleeves along said booms, and means mounting said pillow blocks on said heads for pivotal movement about vertical axes, whereby said rail structure may be moved between a first position wherein it is perpendicular to said booms and a second position wherein it is slightly inclined relative thereto.

17. A machine as claimed in claim 16, further comprising a power jack and means mounting the ends of said jack respectively to one of said heads and to said rail structure for shifting said rail structure along said first direction, laterally with respect to said booms.

18. A machine as claimed in claim 16, wherein said rail structure oscillating means comprise: linkage means between said pillow block cylinder and said rail-structure-holding head and a power jack having one end mounted on said head and the other end mounted on said linkage means, constructed to cause oscillation of said pillow block when said power jack is actuated whereby to cause oscillation of said rail structure and said saw carrier in unison.

19. A machine as claimed in claim 16, including second means for displacing said saw carrier and saw bodily in said second direction.

20. A machine as claimed in claim 1, further comprising: terminal rail sections at the ends of said main rail section beyond said rail-structure-holding heads, said terminal rail sections being in the continuation of said main rail section and being constructed for allowing displacement of said carrier thereon; and powered pivot means on said terminal rail sections and at the ends of said main rail section operative to pivot said terminal rail sections vertically about an axis normal to said longitudinal axis of said upper suspension member of said main rail section.

21. A machine including a powered truck-like vehicle having a support base and an apparatus mounted on the base for cutting a drive-in passage across a curbstone, a sidewalk or the like, said apparatus comprising:
two spaced parallel booms mounted, at one end, on said base;
a pair of rail-structure-holding heads slidably mounted each on one of said booms and means for displacing said heads along said booms;
an elongated main rail structure extending between said heads and means mounting said main rail structure on said heads, said rail structure including an elongated upper suspension member having a longitudinal axis;
a saw carrier, and means, solid with said saw carrier, for mounting said saw carrier on said main rail structure and for displacing said saw carrier thereon in a first direction parallel to said suspension member longitudinal axis;
a saw mounted on said carrier and wherein said carrier includes first means for displacing said saw on said carrier in a second direction perpendicular to said first direction;
a power jack and means mounting the end of said jack respectively to one of said heads and to said rail structure suspension member for shifting said rail structure along said first direction, laterally with respect to said booms;
second means for displacing said saw carrier and saw bodily in said second direction;
said suspension member having a non-circular cross section and said means mounting said main rail structure on said heads comprise:
pillow blocks, each having a rotary cylinder, said pillow blocks being each mounted on one of said heads, said cylinders being formed with bores therethrough of non-circular cross section; wherein said rail structure suspension member slidably extends through said non-circular bores for rotation with said cylinders;
operative means interconnecting at least one of said heads and the respective pillow-block cylinder for oscillating said suspension member, and thus said rail structure, about said longitudinal axis.

22. A machine as claimed in claim 21, wherein said rail structure comprises parallel tracks extending in said first direction and wherein said saw carrier mounting means comprise:
a pair of mounting plates, each on one side of said rail structure;
rollers on said mounting plates riding on said parallel tracks; and
power means for driving said plates and rollers along said tracks.

23. A machine as claimed in claim 22, wherein said saw carrier comprises:
two terminal plates spaced from one another;
a pair of double-action power jacks projecting in said second direction and including jack rods having ends secured to said terminal plates and operative cylinders through which said jack rods extend; and
means securing said cylinders to said mounting plates of said carrier mounting means;

said double-action power jacks constituting said second means for displacing said carrier and saw bodily in said second direction.

24. A machine as claimed in claim 23, wherein said first means for displacing said saw on said carrier, in a second direction perpendicular to said first direction, comprise:
a pair of guide rods spaced from said double-action power jacks with respect to said carrier mounting plates, said guide rods having ends secured to said carrier terminal plates;
a saw mounting-motor bridge including sleeve members slidable on said guide rods;
a motor on said bridge operatively connected to said saw; and
power means for displacing said bridge, with said motor and saw thereon, between said terminal plates.

25. A machine as claimed in claim 24, wherein said parallel tracks of said elongated rail structure are two elongated rail members spaced from one another and wherein said machine further comprises: stems, perpendicular to said spaced rail members and located therebetween; said stems securing said rail members to said suspension member.

26. A machine as claimed in claim 21, wherein said rail structure oscillating means comprise: linkage means between said pillow block cylinder and said rail-structure-holding head and a power jack having one end mounted on said head and the other end mounted on said linkage means, constructed to cause oscillation of said pillow block when said power jack is actuated whereby to close oscillation of said rail structure and said saw carrier in unison.

27. A machine as claimed in claim 26, wherein said linkage means include a bracket secured at one end of said pillow block cylinder and extending radially therefrom.

28. A machine as claimed in claim 21, wherein said means for displacing said heads along said booms comprise: sleeves slidable on said booms; means securing said rail-structure-holding heads to said sleeves; power jacks having ends secured respectively to said support base and sleeves for displacing said sleeves along said booms, and means mounting said pillow blocks on said heads for pivotal movement about vertical axes whereby said rail structure may be moved between a first position wherein it is perpendicular to said booms and a second position wherein it is slightly inclined relative thereto.

* * * * *